United States Patent
Shimokawa et al.

(10) Patent No.: US 9,848,116 B2
(45) Date of Patent: Dec. 19, 2017

(54) SOLID-STATE IMAGE SENSOR, ELECTRONIC DEVICE, AND AUTO FOCUSING METHOD

(71) Applicant: SAMSUNG ELECTRONICS CO., LTD., Suwon-si, Gyeonggi-do (KR)

(72) Inventors: Shuichi Shimokawa, Suwon-si (KR); Dong-min Kim, Suwon-si (KR); Sang-min Lee, Suwon-si (KR); Kwi-sung Yoo, Seoul (KR); Seung-hyun Lim, Yongin-si (KR); Woo-seok Choi, Suwon-si (KR); Beoung-ouk Min, Yongin-si (KR); Takafumi Usui, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/582,614

(22) Filed: Dec. 24, 2014

(65) Prior Publication Data

US 2015/0237253 A1    Aug. 20, 2015

(30) Foreign Application Priority Data

Feb. 14, 2014 (KR) .................. 10-2014-0017393

(51) Int. Cl.
*H04N 5/232* (2006.01)
*H04N 5/369* (2011.01)
*H04N 5/357* (2011.01)
*H04N 5/378* (2011.01)
*H04N 101/00* (2006.01)

(52) U.S. Cl.
CPC ....... *H04N 5/23212* (2013.01); *H04N 5/3575* (2013.01); *H04N 5/369* (2013.01); *H04N 5/3696* (2013.01); *H04N 5/378* (2013.01); *H04N 2101/00* (2013.01)

(58) Field of Classification Search
USPC ........................................... 348/345
See application file for complete search history.

(56) References Cited

U.S. PATENT DOCUMENTS

| | | |
|---|---|---|
| 2009/0141154 A1 | 6/2009 | Mabuchi et al. |
| 2010/0165176 A1 | 7/2010 | Taniguchi |
| 2011/0019041 A1 | 1/2011 | Ishiwata et al. |
| 2011/0096211 A1* | 4/2011 | Oikawa .................. G03B 13/36 348/273 |

(Continued)

FOREIGN PATENT DOCUMENTS

| | | |
|---|---|---|
| JP | 2009-089144 A | 4/2009 |
| JP | 2009-105878 A | 5/2009 |

OTHER PUBLICATIONS

PCT Search Report and Written Opinion issued for PCT/KR2014/011665 (dated Feb. 12, 2015).

(Continued)

*Primary Examiner* — Stephen Coleman
(74) *Attorney, Agent, or Firm* — Drinker Biddle & Reath LLP

(57) ABSTRACT

A solid-state image sensor of an electronic device includes a plurality of pixels arranged in a matrix form and having a plurality of phase difference pixel of the plurality of pixels. The plurality of phase difference pixels are arranged at locations of pixels that are commonly read out in a plurality of different skip readout modes.

22 Claims, 14 Drawing Sheets

(56) References Cited

U.S. PATENT DOCUMENTS

2011/0267511 A1  11/2011  Imafuji
2012/0057057 A1  3/2012  Amano
2013/0088621 A1  4/2013  Hamada
2014/0022446 A1  1/2014  Endo et al.

OTHER PUBLICATIONS

European Search Report issued for EP 15155121.5 (dated Jul. 9, 2015).
European Examination Report issued EP 15155121.5 (dated Jul. 31, 2015).

* cited by examiner

FIG. 2

| B | G | B | G |
|---|---|---|---|
| G | R | G | R |
| B | G | B | G |
| G | R | G | R |
| B | G | B | G |
| G | R | G | R |

FIG. 3

| P | G | B | P |
|---|---|---|---|
| G | R | G | R |
| B | G | B | G |
| P | R | G | P |
| B | G | B | G |
| G | R | G | R |

SOLID-STATE IMAGE SENSOR, ELECTRONIC DEVICE, AND AUTO FOCUSING METHOD

CROSS-REFERENCE TO RELATED PATENT APPLICATIONS

This application claims priority from Korean Patent Application No. 10-2014-0017393, filed on Feb. 14, 2014, in the Korean Intellectual Property Office, the disclosure of which is incorporated herein by reference in its entirety.

BACKGROUND

1. Field

Apparatuses and methods consistent with the present disclosure relate to auto focusing, and more particularly, to a solid-state image sensor, an electronic device, and an auto focusing method, for auto focusing using a phase difference of a photography surface.

2. Related Art

As examples of auto focusing technologies by a typical digital camera, contrast auto focus (AF) and phase difference AF are used.

The contrast AF refers to a method for driving a focus lens to discover a peak value of contrast of an object by a digital camera and adjusts focus. When a focal point is focused in front of the object (front focusing) or is focused behind the object (back focusing), contrast is degraded. On the other hand, when a focal point is focused at the object, the contrast is a maximum. According to the contrast AF, a point (object focal point) from which contrast is increased and then reduced needs to be discovered in order to discover a point in which contrast is a maximum, a lens is moved backward and forward. Thus, an operation in which an image is blurred and then is sharpened is repeated to focus a focal point. Likewise, according to the contrast AF, since a focal point is focused by directly moving a focus lens, an image displayed on an electronic view finder becomes blurred and focusing is lengthened. However, since a lens is directly moved, a focal point is accurately focused.

The phase difference AF refers to a method for detecting a phase difference of images formed at a solid-state image sensor to adjust focusing. The phase difference AF has characteristics whereby a phase difference increases in both cases of front focusing and back focusing. According to the phase difference AF, focusing direction information as well as a phase difference value can be recognized via a detected phase difference, and thus, focusing is possible by moving a focus lens once only. That is, a movement value of a lens based on the phase difference and the focusing direction information is pre-calculated and then the focus lens is driven once with reference to the movement value to perform focusing. Accordingly, focusing may be rapidly performed without blurring of an image displayed on an electronic view finder. However, in general, it is known that focus accuracy is degraded compared with the contrast AF.

With regard to the phase difference AF, how phase difference pixels are arranged in a solid-state image sensor is an important issue. When too large of a number of phase difference pixels are arranged in the solid-state image sensor, image resolution may be degraded, and when too small of a number of phase difference pixels are arranged in the solid-state image sensor, it is difficult to detect an accurate phase difference. In addition, an electronic device with an object imaging function supports various imaging modes such as a live view mode, a still image mode, a moving image mode, etc. In this regard, locations of readout pixels for generation of images are different in the various modes and may be changed according to imaging performance in each mode according to arrangement of phase difference pixels. Thus, there is a need for technology for arranging phase difference pixels for improving the performance of a digital camera in a solid-state image sensor using phase difference AF.

SUMMARY

Various embodiments of the present disclosure may overcome one or more of the above disadvantages or other disadvantages not described above. Also, the present disclosure is not required to overcome the disadvantages described above, and an exemplary embodiment of the present disclosure may not overcome any of the problems described above.

The present disclosure provides a solid-state image sensor, an electronic device, and an auto focusing method, for auto focusing without blurring of an image by detecting a phase difference in various modes of an electronic device having a photography function.

According to an embodiment, a solid-state image sensor of an electronic device includes: a plurality of pixels arranged in a matrix form; and a plurality of phase difference pixels, of the plurality of pixels, arranged at locations of pixels that are commonly read out in a plurality of different skip readout modes.

The plurality of skip readout modes may include a first skip readout mode in which one pixel line is read out and two pixel lines are skipped and a second skip readout mode in which two pixel lines are read out and two pixel lines are skipped.

The plurality of pixels may be classified into a first pixel region that is read out in the first skip readout mode and a second pixel region that is read out in the second skip readout mode and are processed. The plurality of phase difference pixels may be arranged such that portions of the first and second pixel regions overlap each other.

The plurality of pixels may have a matrix pattern in which one first phase difference pixel, two first general pixels, one second phase difference pixel, and 8 second general pixels are sequentially arranged in a vertical or horizontal direction.

The first phase difference pixel and the second phase difference pixel may be different types of phase difference pixels of one pair of phase difference pixels.

Each of the plurality of phase difference pixels may be spaced apart from another adjacent phase difference pixel at an interval corresponding to at least two pixels.

According to another embodiment, an electronic device includes: a solid-state image sensor comprising a plurality of pixels arranged in a matrix form, the plurality of pixels having a plurality of phase difference pixels arranged at locations of pixels that are commonly read out in a plurality of different skip readout modes; and a controller for reading out data of the phase difference pixel to detect a phase difference and performing lens focusing based on the detected phase difference.

The controller reads out data of pixels except for the phase difference pixels from the plurality of pixels to generate an image.

The image may be any one of a live view image, a still image, or a moving picture image.

The plurality of skip readout modes may include a first skip readout mode in which one pixel line is read out and two pixel lines are skipped and a second skip readout mode in which two pixel lines are read out and two pixel lines are skipped.

The pixel line may be any one of a horizontal pixel line or a vertical pixel line of a plurality of pixels that are arranged in a matrix form.

The controller may read out a first pixel region of the plurality of pixels in the first skip readout mode and reads out a second pixel region of the plurality of pixels in the second skip readout mode. The plurality of phase difference pixels may be arranged such that portions of the first and second pixel regions overlap each other.

The controller may generate a first resolution image in the first skip readout mode and generates a second resolution image in the second skip readout mode.

The plurality of pixels may have a matrix pattern in which one first phase difference pixel, two first general pixels, one second phase difference pixel, and 8 second general pixels are sequentially arranged in a vertical or horizontal direction.

The first phase difference pixel and the second phase difference pixel may be different types of phase difference pixels of one pair of phase difference pixels.

Each of the plurality of phase difference pixels may be spaced apart from another adjacent phase difference pixel at an interval corresponding to at least two pixels.

According to another embodiment, an auto focusing method of an electronic device includes: detecting a phase difference by reading out data of a plurality of pixels arranged in a matrix form, including data of a plurality of phase difference pixels of the plurality of pixels, the plurality of phase difference pixels arranged at locations of pixels that are commonly read out in a plurality of different skip readout modes; and performing lens focusing based on the detected phase difference.

The method may further include: reading out data of a pixel of a predetermined region from the plurality of pixels in a predetermined skip readout mode; and generating an image using readout data of pixels except for the phase difference pixel from the data of the readout pixel.

The image may be any one of a live view image, a still image, or a moving picture image.

The plurality of skip readout modes may include a first skip readout mode and a second skip readout mode. The reading out of the data of the predetermined region may include reading out one pixel line and skipping two pixel lines in the first skip readout mode, and reading out two pixels lines and skipping two pixel lines in the second skip readout mode.

The pixel line may be any one of a horizontal pixel line or a vertical pixel line of a plurality of pixels that are arranged in a matrix form.

A first pixel region of the plurality of pixels may be read out in the first skip readout mode and a second pixel region of the plurality of pixels is read out in the second skip readout mode. The plurality of phase difference pixels may be arranged such that portions of the first and second pixel regions overlap each other.

The generating of the image may include generating a first resolution image in the first skip readout mode and generating a second resolution image in the second skip readout mode.

The plurality of pixels may have a matrix pattern in which one first phase difference pixel, two first general pixels, one second phase difference pixel, and 8 second general pixels are sequentially arranged in a vertical or horizontal direction.

The first phase difference pixel and the second phase difference pixel may be different types of phase difference pixels of one pair of phase difference pixels.

The various aforementioned embodiments provide a solid-state image sensor, an electronic device, and an auto focusing method, for auto focusing without blurring of an image by detecting a phase difference in various modes of an electronic device having a photography function.

Additional and/or other aspects and advantages of the invention will be set forth in part in the description which follows and, in part, will be obvious from the description, or may be learned by practice of the invention.

BRIEF DESCRIPTION OF THE DRAWING

The above and/or other embodiments of the present disclosure will be more apparent by describing various embodiments with reference to the accompanying drawings, in which:

FIG. 2 is a diagram illustrating an arrangement of a plurality of pixels of a solid-state image sensor, according to an embodiment;

FIG. 3 is a diagram illustrating an arrangement of phase difference pixels and general pixels, according to an embodiment;

FIG. 5 is a diagram illustrating an arrangement of phase difference pixels and general pixels in a first skip readout mode, according to an embodiment;

FIG. 6 is a diagram illustrating an arrangement of phase difference pixels and general pixels in a second skip readout mode, according to an embodiment;

FIG. 7 is a diagram illustrating an arrangement of phase difference pixels and general pixels in a third skip readout mode, according to an embodiment;

FIG. 8 is a diagram illustrating an arrangement of phase difference pixels and general pixels in a fourth skip readout mode, according to an embodiment;

FIG. 9 is a diagram illustrating another arrangement of phase difference pixels and general pixels, according to an embodiment;

DETAILED DESCRIPTION

Various embodiments will now be described in greater detail with reference to the accompanying drawings.

Figure 1:
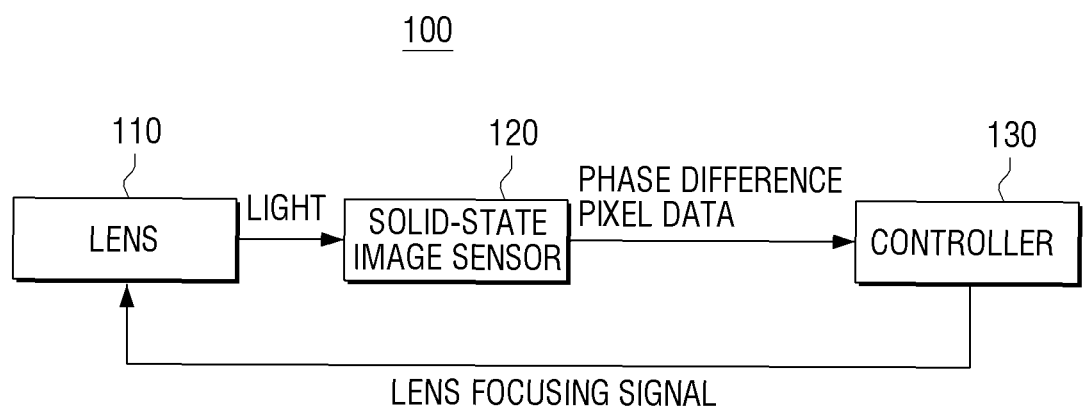
FIG. 1 is a schematic block diagram illustrating components of an electronic device having an imaging function, according to an embodiment.
Figure 2:
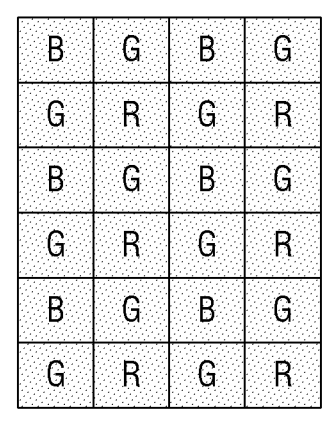
Figure 3:
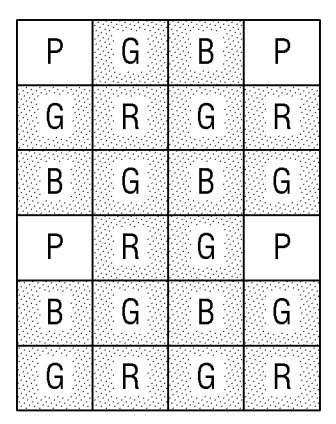

FIG. 1 is a schematic block diagram of components of an electronic device 100 having an imaging function according to an embodiment. FIG. 2 is a diagram illustrating an arrangement of a plurality of pixels of a solid-state image sensor 120 of the electronic device 100. FIG. 3 is a diagram illustrating an arrangement of phase difference pixels and general pixels according to an embodiment.

Referring to FIG. 1, the electronic device 100 according to an embodiment includes a lens 110, the solid-state image sensor 120, and a controller 130.

The lens 110 is a component on which light reflected from an object is incident and includes at least one of a zoom lens, for controlling a viewing angle to be narrowed or widened according to a focal distance, and a focus lens, for focusing a focal point of an object. The lens 110 is accommodated in a barrel (not shown) of the electronic device 100 and is moved to adjust a focal point according to a driving signal of a motor driver 115 (FIG. 10), as described below. In addition, the barrel includes a shutter (not shown) and an aperture (not shown) which each adjust an amount of light incident on the lens 110, for example, using respective driving motors.

The solid-state image sensor 120 is a component for forming an object image from light passing through the lens 110. The solid-state image sensor 120 includes a plurality of pixels that are arranged in a matrix form. Each of the plurality of pixels receives photons according to incident light and outputs an image corresponding to the photons as an electric signal. The solid-state image sensor 120 may be a charge coupled device (CCD), a complementary metal oxide semiconductor (CMOS) device, or the like.

According to an embodiment, the solid-state image sensor 120 includes a plurality of phase difference pixels that are arranged at pixel locations of the plurality of pixels that are commonly read out in a plurality of different skip readout modes (e.g., the phase difference pixels are common to each of the plurality of skip readout modes). Here, a skip readout mode refers to a readout mode in which all of the plurality of pixels are not read out, thus only some pixels of the plurality of pixels are read out, the remaining pixels are not read out (i.e., the pixels are skipped). The skip readout mode is used for the following reason. With regard to a live view image or a moving picture image, since image processing load becomes more intensive based on a frame rate and image resolution of the moving picture image, an image may be generated using only some pixels to enhance image processing speed. However, with regard to a still image, when a high resolution image is not necessary, only some pixels are also read out in the skip readout mode to generate a lower resolution image. The electronic device 100 may support a mode for generating a lower resolution still image according to a user input.

FIG. 2 illustrates arrangement of a plurality of pixels according to an embodiment. That is, as illustrated in FIG. 2, a plurality of pixels may form a Bayer pattern. In FIG. 2, each pixel illustrated with a grey shadow indicates that data of the corresponding pixel is read out. In an "all readout" mode in which all pixels are read out instead of reading out some pixels, image data of a plurality of pixels is entirely read out as shown in FIG. 2.

However, as described above, according to an embodiment, a plurality of pixels includes a plurality of phase difference pixels. That is, according to an embodiment, as illustrated in FIG. 3, each of a plurality of phase difference pixels is positioned instead of a general pixel at the aforementioned location from the plurality of pixels.

In FIG. 3, a region illustrated with grey shadow refers to a general pixel (e.g., including R, G, and B pixels) and a region that is illustrated without shadow refers to a phase difference pixel (which is denoted by P as a first character of Phase).

Since phase difference pixels are mixed between general pixels, image data read out from a phase difference pixel is excluded in the all readout mode in order to generate an image. In this case, a value for a general pixel corresponding to a phase difference pixel portion is interpolated using general pixels adjacent to the phase difference pixels.

Figure 4:
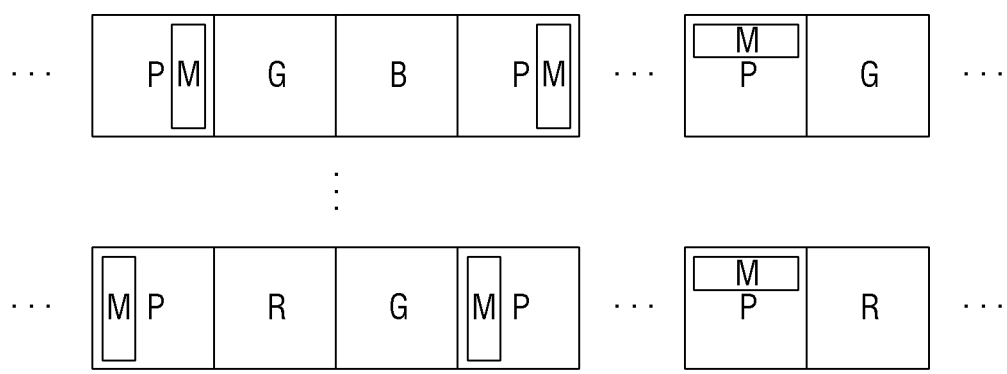
FIG. 4 is a diagram illustrating upper and lower phase pixel pairs and right and left phase pixel pairs, according to an embodiment.

FIG. 4 is a diagram illustrating upper and lower phase pixel pairs and right and left phase pixel pairs.

According to a phase difference auto focusing principle, an image formed by light incident on the lens 110 is divided into right and left images or upper and lower images, and a phase difference at a point at which the left image and the right image are imaged or a phase difference at a point at which the upper image and the lower image are imaged is used for auto focusing. For example, a left phase difference pixel and a right phase difference pixel are grouped as a first pair and an upper phase difference pixel and a lower phase difference pixel are grouped as a second pair so as to constitute a phase difference pixel set. In some embodiments, only one set of the right and left phase difference pixel set and the upper and lower phase difference pixel set may be used.

In order for each phase difference pixel of the plurality of phase difference pixels to separate any one direction image from an entire image, a mask M is positioned at a point when another direction image is imaged as illustrated in FIG. 4. An image inclined toward one direction is imaged on phase difference pixel sets constituting a pair according to a location of the lens 110. Comparing a location of an image imaged on one pair of phase difference pixels when a focal point is focused in front of a phase difference pixel with a location of an image imaged on the pair of phase difference pixels when a focal point is focused behind the phase difference pixel, a movement direction of the lens 110 of the case in which a focal point is accurately focused on the phase difference pixel may be expected. In general, as a focal point is widened, a phase difference is increased and a movement location of the lens 110 may be determined using a lookup table that defines a relation between a focal point and a phase difference value.

However, embodiments are not limited to an embodiment in which the mask M is positioned at the phase pixel P as illustrated in FIG. 4. That is, the mask M may be positioned at another location. For example, masks M may be arranged in a diagonal direction on one pair of phase difference pixels.

Figure 5:
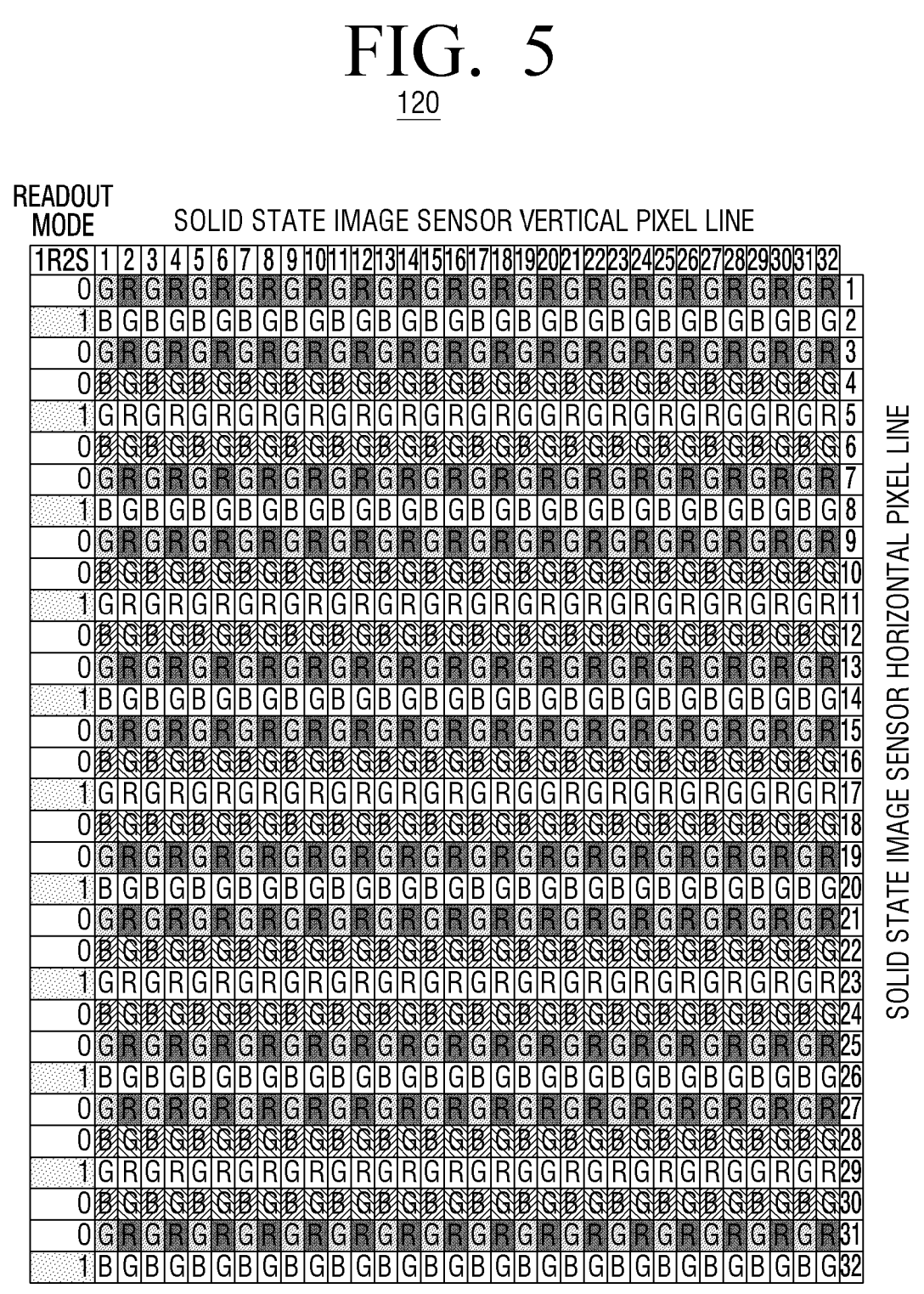

FIG. 5 is a diagram illustrating an arrangement of phase difference pixels and general pixels in a first skip readout mode for the solid-state image sensor 120, according to an embodiment.

According to the current embodiment, a mode in which one pixel line is read out and two pixel lines are skipped may be defined as a first skip readout mode 1R2S. As illustrated in FIG. 5, in the first skip readout mode, readout is performed by reading out pixels of a second horizontal pixel line, skipping pixels of third and fourth horizontal pixel lines, and then reading out pixels of a fifth horizontal pixel line, from the plurality of pixels. Thus, it may be seen that phase difference pixel lines are arranged with a 3 pixel interval in a vertical direction.

Phase difference pixels may be arranged in readout horizontal pixel lines. In FIG. 5, phase difference pixels are disposed in horizontal pixel lines that are illustrated without shadow. When data of a horizontal pixel line is rapidly read out compared with a horizontal synchronization time, the speed may not be increased according to horizontal direction skip, and thus, phase difference pixels may be freely arranged in a horizontal pixel line as long as image resolution is not unsuitably degraded.

Figure 6:
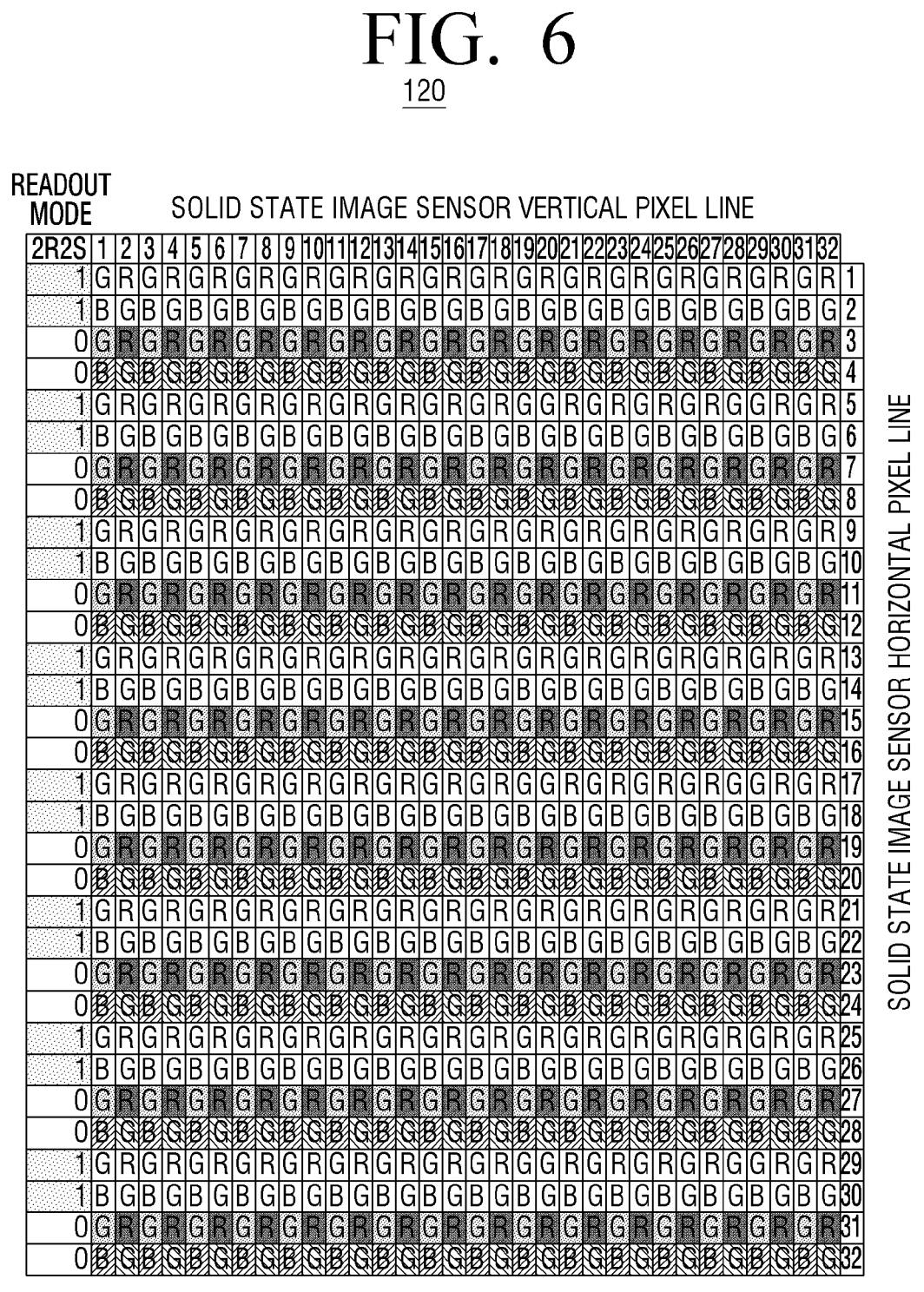

FIG. 6 is a diagram illustrating an arrangement of phase difference pixels and general pixels in a second skip readout mode for the solid-state image sensor 120, according to an embodiment.

According to the current embodiment, a mode in which two pixel lines are read out and two pixel lines are skipped may be defined as a second skip readout mode 2R2S. As illustrated in FIG. 6, in the second skip readout mode, readout is performed by reading out pixels of first and second horizontal pixel lines, skipping pixels of third and fourth horizontal pixel lines, and then reading out pixels of fifth and sixth horizontal pixel lines, from a plurality of pixels. Thus, it may be seen that phase difference pixel lines are arranged with a 4 pixel interval in a vertical direction.

Phase difference pixels may be arranged in a readout horizontal pixel line. In FIG. 6, phase difference pixels are disposed in horizontal pixel lines illustrated without shadow. When data of a horizontal pixel line is rapidly read out compared with horizontal synchronization time, the speed may not be increased according to horizontal direction skip, and thus, phase difference pixels may be freely arranged in a horizontal pixel line as long as image resolution is not unsuitably degraded.

Figure 7:
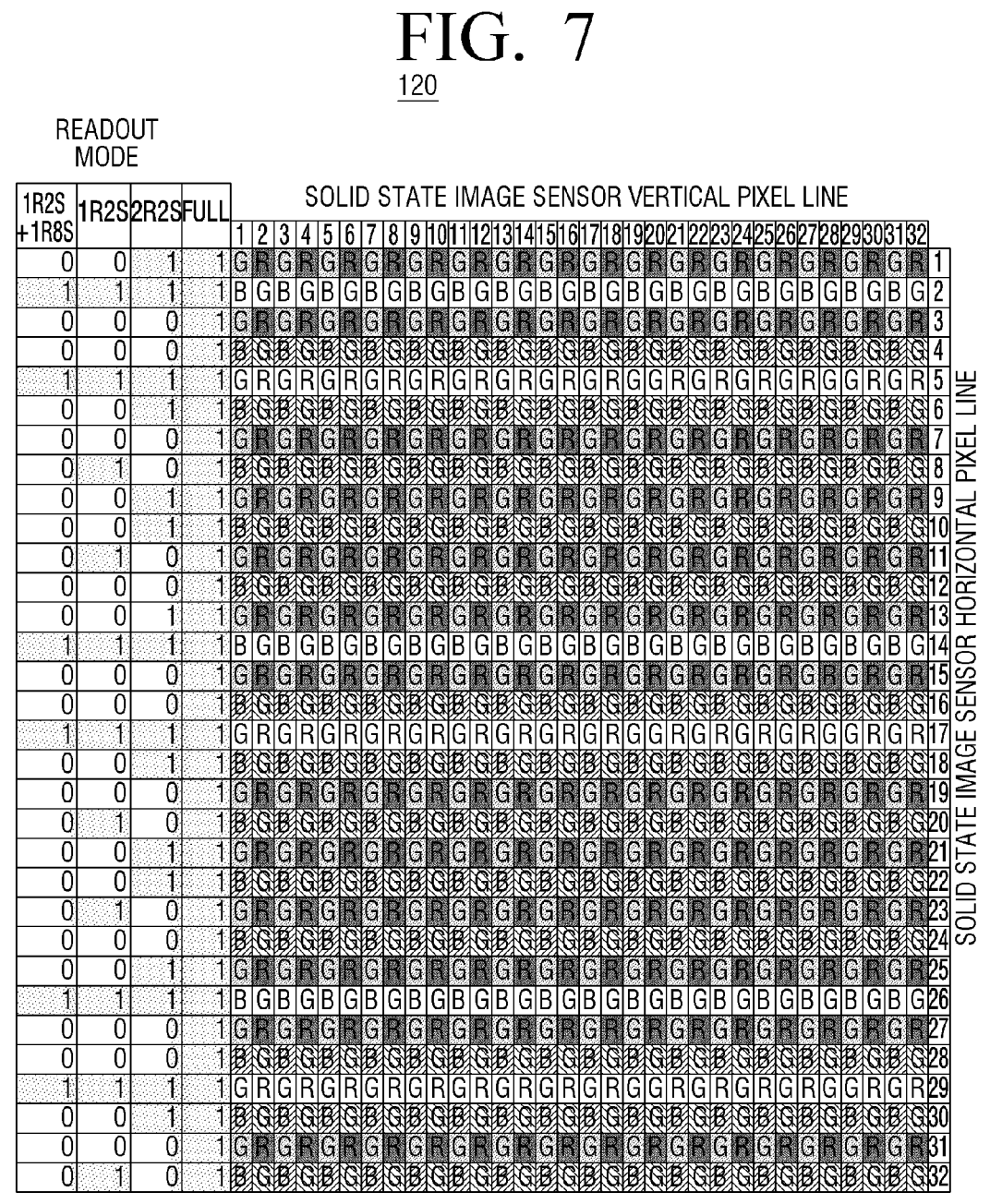

FIG. 7 is a diagram illustrating an arrangement of phase difference pixels and general pixels in a third skip readout mode.

Phase difference pixels may be arranged at locations of pixels that are commonly readout in a plurality of different skip readout modes, from a plurality of pixels of the solid-state image sensor 120.

According to an embodiment, the plurality of skip readout modes may include the first skip readout mode 1R2S in which one pixel line is readout and two pixel lines are skipped and the second skip readout mode 2R2S in which two pixel lines are readout and two pixel lines are skipped.

As illustrated in FIG. 7, in the first skip readout mode, readout is performed by reading out pixels of a second horizontal pixel line, skipping pixels of third and fourth horizontal pixel lines, and then reading out pixels of a fifth horizontal pixel line, from a plurality of pixels. In the second skip readout mode, readout is performed by reading out pixels of first and second horizontal pixel lines, skipping pixels of third and fourth horizontal pixel lines, and then reading out pixels of fifth and sixth horizontal pixel lines, from a plurality of pixels. Among these horizontal pixel lines, the second and fifth horizontal pixel lines are common, and thus, phase difference pixels are arranged in the corresponding horizontal pixel lines. A pixel line that is illustrated without shadow in FIG. 7 is a phase difference pixel line.

That is, the plurality of pixels may be classified into a first pixel region that is read out in the first skip readout mode and a second pixel region that is read out in the second skip readout mode, and the plurality of phase difference pixels are arranged at portions in which the first and second pixel regions overlap each other.

A phase pixel is a component that detects a phase difference to perform auto focusing, however the number of phase difference pixels for performing auto focusing does not have to be too great. As the number of phase difference pixels is increased, image resolution of an output image may be degraded. Thus, in consideration of a plurality of skip readout modes, the reduced number of phase difference pixels compared with in a separate mode is not a problem.

According to an embodiment, each of the plurality of phase difference pixels may be spaced apart from another adjacent phase difference pixel at an interval corresponding to at least a predetermined number of pixels. When phase difference pixels are too close to each other, it is more difficult to accurately detect a phase difference, and thus, a predetermined number of general pixels may be disposed between one pair of phase difference pixels. According to the current embodiment, two general pixels may be arranged between one pair of phase difference pixels.

As described in the aforementioned embodiment, when phase difference pixels are arranged in a pixel region that is commonly read out in the first skip readout mode 1R2S in which one pixel line is readout and two pixel lines are skipped and in the second skip readout mode 2R2S in which two pixel lines are skipped, an interval for arrangement of the phase difference pixel corresponds to 12 pixels as a least common multiple of the two modes.

When at least two general pixels are present between phase difference pixels within one interval of the phase difference pixels, it may be seen that one phase difference pixel line (horizontal), two general pixel lines (horizontal), one phase difference pixel line (horizontal), and 8 general pixel lines (horizontal) constitute one interval in a vertical direction, as illustrated in FIG. 7 (1R2S+1R8S). The electronic device 100 may set this type of readout mode as one readout mode (e.g., a third skip readout mode).

When phase difference pixels are arranged as shown for the third skip readout mode, data of phase difference pixels may be uniformly read out in an all readout mode and a plurality of skip readout modes, and thus, a phase difference may be detected in all modes. Accordingly, auto focusing may be possible without blurring of an image in all modes.

When data of a horizontal pixel line is rapidly readout compared with horizontal synchronization time, the speed may not be increased according to horizontal direction skip, and thus, phase difference pixels may be freely arranged in a horizontal pixel line as long as resolution is not unsuitably degraded.

Figure 8:
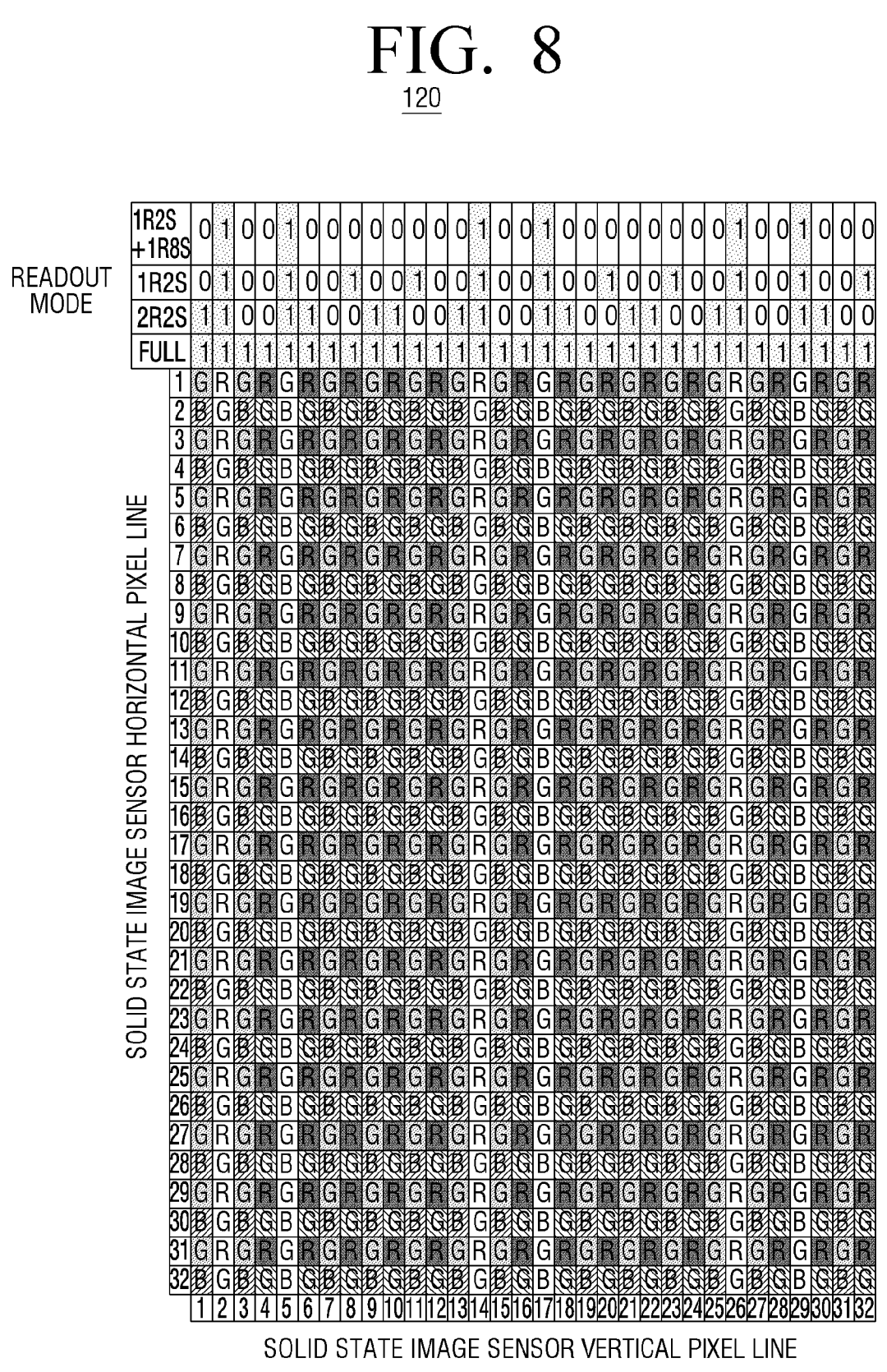

With regard to a vertical pixel line as well as a horizontal pixel line, a fourth skip readout mode similar to the third skip readout mode may be set. FIG. 8 illustrates this embodiment.

That is, FIG. 8 is a diagram illustrating an arrangement of phase difference pixels and general pixels in a fourth skip readout mode according to an embodiment.

As illustrated in FIG. 8, readout is performed by reading out pixels of a second vertical pixel line, skipping pixels of third and fourth vertical pixel lines, reading out pixels of a fifth vertical pixel line, and then skipping sixth to thirteenth vertical pixel lines, from a plurality of pixels. (1R2S+1R8S).

As described in the aforementioned embodiment, all pixels on one vertical pixel line do not have to be phase difference pixels. Thus, each phase difference pixel on the one vertical pixel line may be spaced apart from another adjacent phase difference pixel at an interval corresponding to at least a predetermined number of pixels. According to the current embodiment, two general pixels may be arranged between one pair of phase difference pixels.

When an image resolution supported by an electronic device is relatively high and thus horizontal synchronization time is affected by the number of data on a pixel line readout in a horizontal direction (or in a vertical direction), all phase difference pixels may not be arranged in a horizontal pixel line. Similarly, when readout of all pixels on a horizontal pixel line in a moving picture mode or a live view mode affects processing speed, only some pixels may be read out and the remaining pixels may be skipped. In this case, phase difference pixels may be arranged in each horizontal pixel line similarly to the aforementioned embodiments (refer to FIG. 9).

Figure 9:
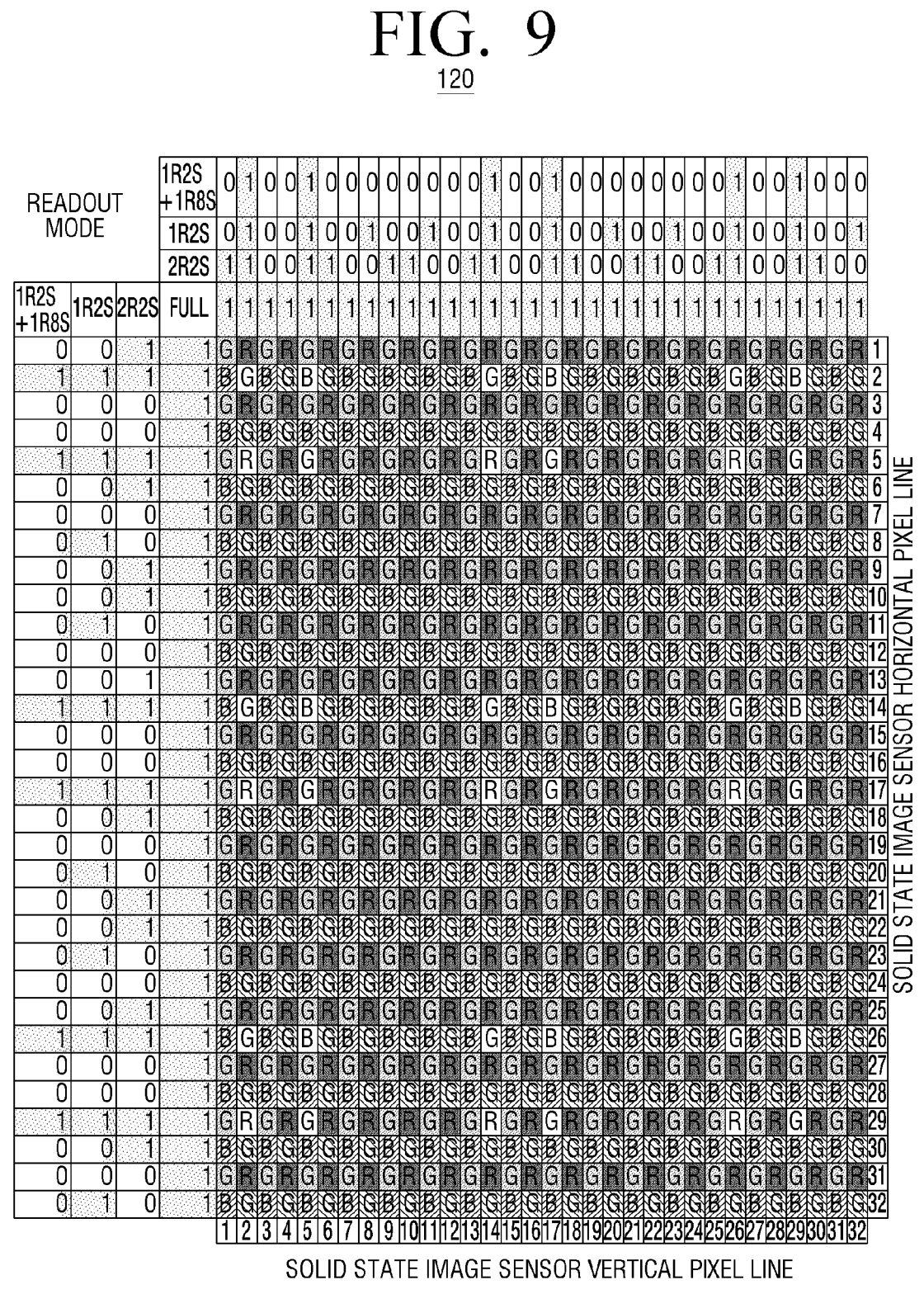

FIG. 9 is a diagram illustrating an arrangement of phase difference pixels and general pixels in a fifth skip readout mode according to an embodiment.

As illustrated in FIG. 9, a skip readout mode in which only some vertical pixel lines are read out and the remaining vertical pixel lines are skipped in a horizontal direction is illustrated. For the aforementioned skip readout mode with respect to a horizontal pixel line together, a fifth skip readout mode in which some pixels are read out with respect to readout horizontal pixel lines and the remaining pixels are skipped may be set, as illustrated in FIG. 9. In the fifth skip readout mode, horizontal pixel lines to be read out in a vertical direction and horizontal pixel lines to be read out are determined, and pixels to be read out in a vertical direction and pixels to be skipped in the horizontal pixel lines to be read out are determined.

As described above, in the third skip readout mode, one horizontal pixel line is read out, two horizontal pixel lines are skipped, one horizontal pixel line is read out, and then 8 horizontal pixel lines are skipped, in a vertical direction.

In the fourth skip readout mode, one vertical pixel line is read out, two vertical pixel lines are skipped, one vertical pixel line is read out, and then 8 vertical pixel lines are skipped, in a horizontal direction.

When phase difference pixels are arranged at locations of pixels that are commonly read out in the third skip readout mode and the fourth skip readout mode, the phase difference pixels may be arranged as illustrated in FIG. 9 (1R2S+1R8S-H+1R2S+1R8 S-V).

The plurality of pixels may be classified into a first pixel region that is read out in the first skip readout mode, a second pixel region that is read out in the second skip readout mode, and a third pixel region that is read out in the fourth skip readout mode, and the plurality of phase difference pixels are arranged at portions in which the first, second, and third pixel regions at least partially overlap each other.

A phase difference pixel may be spaced apart from another adjacent phase difference pixel at an interval corresponding to at least a predetermined number of pixels. When phase difference pixels are too close to each other, it is more difficult to accurately detect a phase difference, and thus, a predetermined number of general pixels are disposed between one pair of phase difference pixels. According to the current embodiment, at least two general pixels may be arranged between one pair of phase difference pixels. That is, phase difference pixels in vertical and horizontal directions may be arranged at an interval corresponding to at least two pixels.

As a result, in the fifth skip readout mode, one horizontal pixel line is read out in a vertical direction, one phase difference pixel is identified in a horizontal direction, two general pixels are identified in a horizontal direction, one phase difference pixel is identified in a horizontal direction, and then 8 general pixels are identified.

Two horizontal pixel lines are read out in a vertical direction, and in this case, a phase difference pixel is not identified.

In addition, one horizontal pixel line is read out in a vertical direction, one phase difference pixel is identified in a horizontal direction, two general pixels are identified in a horizontal direction, one phase difference pixel is identified in a horizontal direction, and then 8 general pixels are identified.

Then 8 horizontal pixel lines are read out in a vertical direction, and in this case, a phase difference pixel is not identified.

While the aforementioned procedure is repeated, a phase difference pixel is identified.

Hereinafter, according to various embodiments, overall configuration of the electronic device 100 and technology of performing auto focusing using the aforementioned phase difference pixel will be described.

Figure 10:
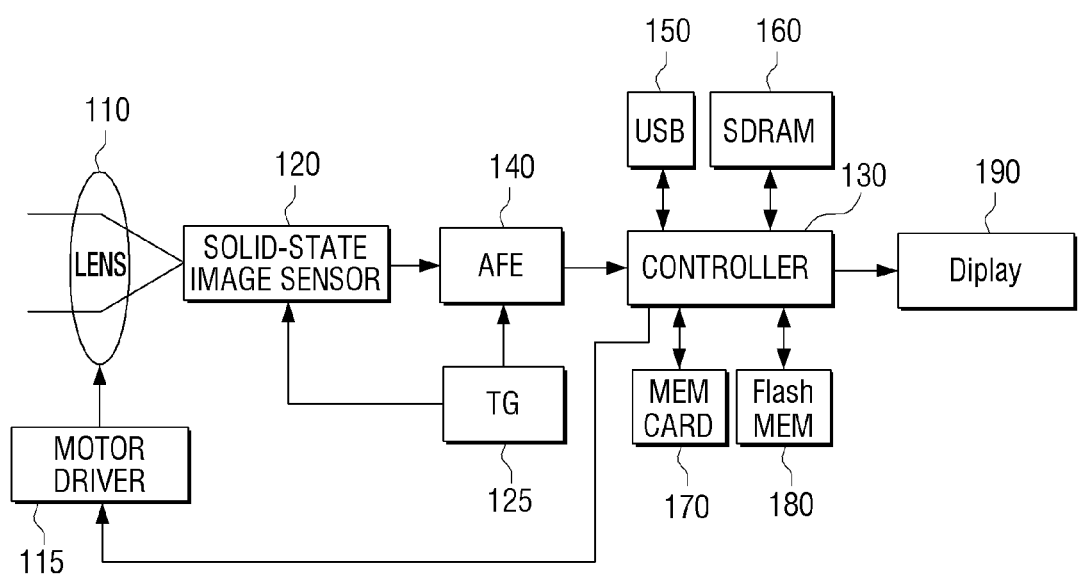
FIG. 10 is a block diagram illustrating a configuration of an electronic device according to another embodiment.

FIG. 10 is a block diagram illustrating a configuration of the electronic device 100 according to another embodiment.

Referring to FIG. 10, the electronic device 100 according to another embodiment includes the lens 110, the solid-state image sensor 120, a timing generator (TG) 125, an analog front end (AFE) 140, the motor driver 115, the controller 130, a universal serial bus (USB) module 150, a synchronous dynamic RAM (SDRAM) module 160, a memory card 170, a flash memory 180, and a display 190.

The controller 130 controls various components of the electronic device 100 to control an overall imaging operation of the electronic device 100. The controller 130 image-processes raw image data and records the raw image data in the SDRAM module 160. In addition, the image-processed data of the SDRAM module 160 is displayed on the display 190. In particular, the controller 130 distinguishes data of a readout phase difference pixels from data of a general pixels and calculates a phase difference using the data of the phase difference pixels. In addition, the controller 130 calculates movement of a focus lens based on the calculated phase difference and controls the motor driver 115 to drive the focus lens. Detailed components and operation of the controller 130 will be described below in more detail.

As described above, the lens 110 is a component on which light reflected from an object is incident and includes at least one of a zoom lens and a focus lens.

As described above, the solid-state image sensor 120 is a component for forming an object image from light passing through the lens 110. The solid-state image sensor 120 includes a plurality of pixels that are arranged in a matrix form. Each of the plurality of pixels receives photons according to incident light and outputs an image caused by the photons as an electric signal.

The TG 125 outputs a timing signal for reading out pixel data of the solid-state image sensor 120. The TG 125 is controlled by the controller 130.

The AFE 140 samples and digitizes an electrical signal on the object image that is output from the solid-state image sensor 120. The AFE 140 is controlled by the controller 130.

However, as described above, the features provided by the AFE 140 and the TG 125 may be incorporated into other components. In particular, when the solid-state image sensor 120 is embodied as a CMOS type device, these components may be omitted.

The controller 130 reads out phase difference pixels and controls the motor driver 115 to drive the focusing lens of the lens 110 based on calculated information to focus on a focal point.

The controller 130 controls various devices to control an overall operation of the electronic device 100. The controller 130 image-processes raw image data and records the raw image data in the SDRAM module 160. In addition, the image-processed data of the SDRAM module 160 may be displayed on the display 190. In particular, the controller 130 distinguishes data of readout phase difference pixels from data of general pixels and calculates a phase difference using the data of the phase difference pixels. In addition, the controller 130 calculates movement of the focus lens based on the calculated phase difference and controls the motor driver 115 to drive the focus lens.

The USB module 150 provides an interface with an external device. When the USB module 150 is connected to a personal computer (PC) or other external devices through a USB cable, the USB module 150 processes transmission and reception of image data. In addition, the USB module 150 may process firmware transmission and reception for upgrade of firmware.

The SDRAM module 160 stores an image or is used for an image process using a central processing unit (CPU) (e.g., the controller 130). According to an embodiment, a double data rate (DDR) SDRAM for doubling output compared with output from a negative edge only by allowing output to be from both positive and negative edges of a system clock.

The flash memory (Flash MEM) 180 may store a firmware program, various adjustment information appropriate for specification of the electronic device 100, setting information of the electronic device 100 according to user input, a captured image file, etc.

The memory card (MEM CARD) 170 may include a flash memory and is detachable from the electronic device 100. The memory card 170 may store a captured image file.

The display 190 is a component for displaying at least one of a user interface including a character, an icon, etc., electronic device information, a live view image, a dynamic image, and a still image. In addition, the display 190 may provide an electronic view finder.

Figure 11:
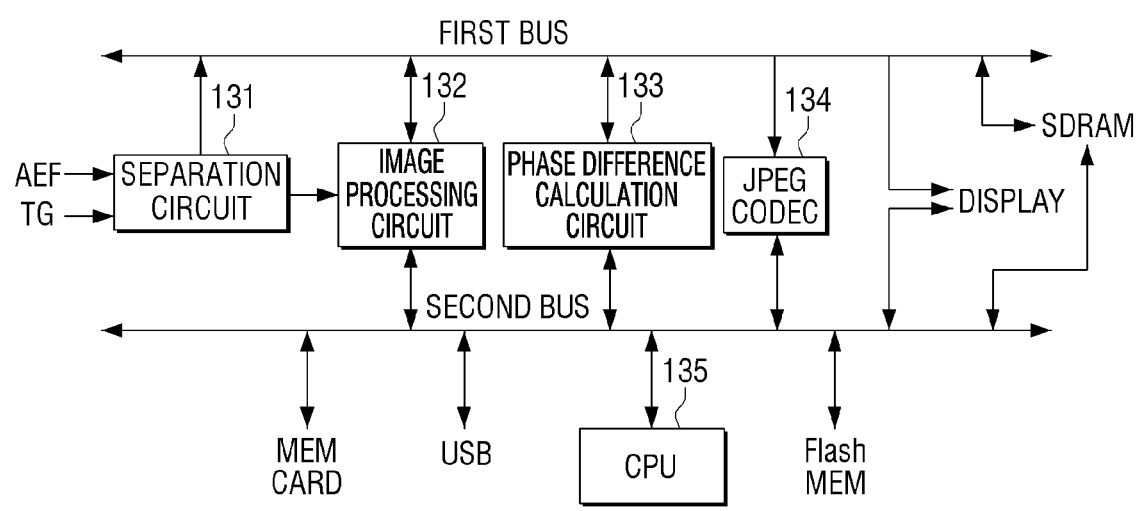
FIG. 11 is a diagram illustrating a block diagram of a circuit configuration of a controller of an electronic device according to an embodiment.
Figure 12:
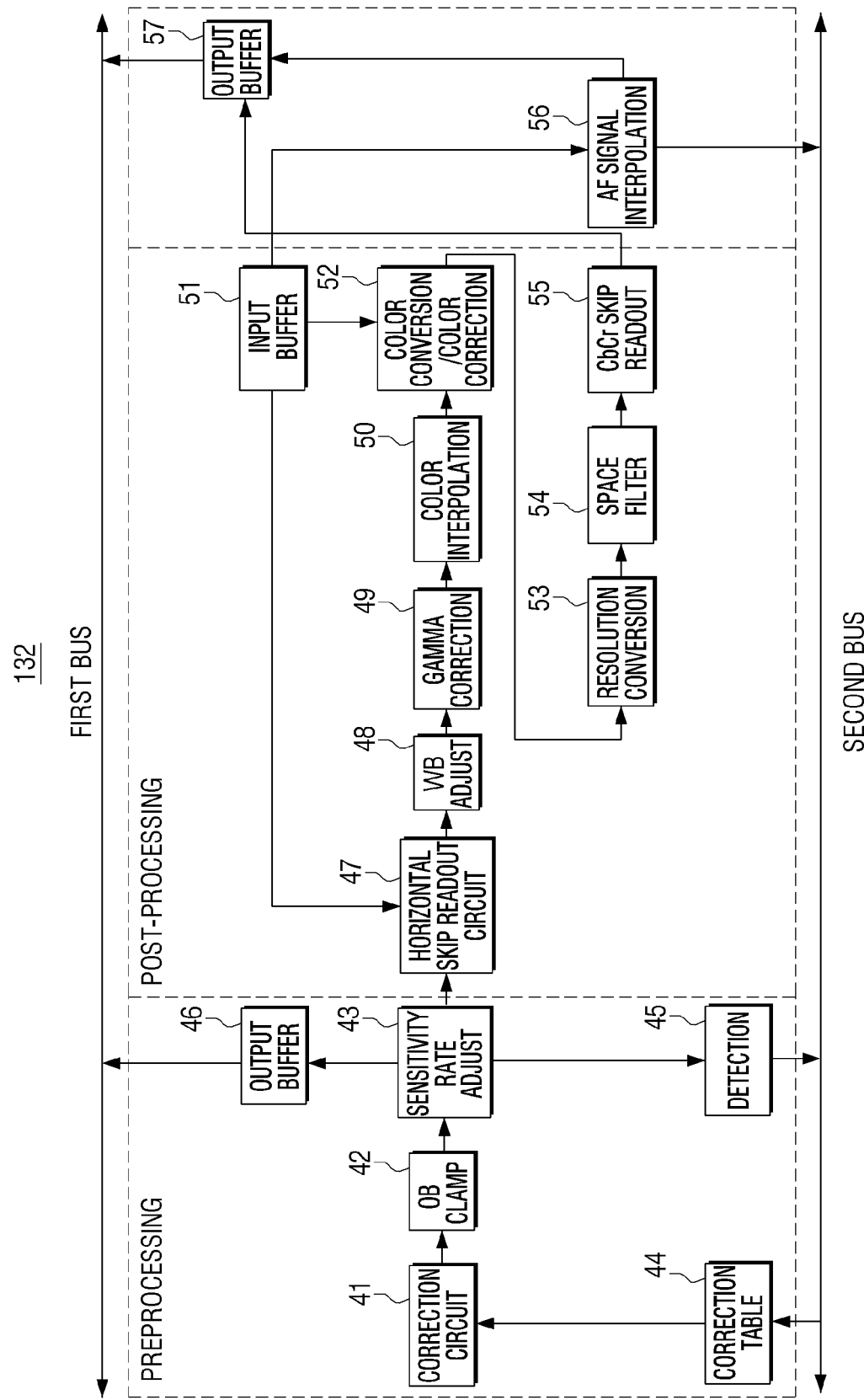
FIG. 12 is a diagram illustrating a block diagram of a circuit configuration of an image processing circuit.

FIG. 11 is a block diagram illustrating an example of a circuit configuration of the controller 130 of electronic device 100 according to an embodiment. FIG. 12 is a block diagram illustrating an example of a circuit configuration of an image processing circuit 132.

Referring to FIG. 11, the controller 130 of the electronic device 100 according to an embodiment includes a separation circuit 131, the image processing circuit 132, a phase difference calculation circuit 133, a Joint Photographic Experts Group (JPEG) codec device 134, and a central processing unit (CPU) 135.

The separation circuit 131 separates a signal for generating an image (a signal readout from a general pixel) and a signal for calculating a phase difference (a signal readout from a phase difference pixel) from signals that are output from the solid-state image sensor 120 and sampled by the AFE 140. This allows for more rapid performance of auto focusing by generating images such as live views in parallel while calculating a phase difference using a signal for calculation of the phase difference.

The image processing circuit 132 processes raw image data into YCbCr data or other color models. Referring to FIG. 12, pixel defects of the raw image data is first corrected by a correction circuit 41. The correction circuit 41 corrects pixel defects with reference to a correction table 44 which registers an address of a defective pixel. Correction is performed on a pixel having the same address as the registered address from a surrounding pixel.

An optical black (OB) clamping circuit 42 determines a black level of an image. The solid-state image sensor 120 has an OB region and detects a signal average value of the OB region to determine the black level based on a difference between pixel values.

A sensitivity rate adjusting circuit 43 performs different sensitivity rate adjustments for respective colors. The sensitivity rate adjusting circuit 43 adjusts sensitivity of colors R, G, and B under standard illuminant. In general, a gain value of G is fixed to 1 and sensitivity of R and B is adjusted according to the gain value of G.

In all readout modes, after sensitivity rate adjustment, image data is output through an output buffer 46. In the all readout modes, an image is generated in an interlace manner, and thus, post-processing may not be immediately performed. On the other hand, in a skip readout mode, an image is generated in a progressive manner, and thus, post-processing may be immediately performed. In the skip readout mode, additional operations are performed as described herein.

A horizontal skip readout circuit 47 performs skip readout, and thus, the number of pixels of a raw image is reduced. This is performed by maintaining a predetermined pixel line and discarding the remaining pixel lines, as described above.

A white balance (WB) adjusting circuit 48 adjusts WB of image data. Spectral distribution of illumination varies according to a photography environment, and thus, even if a white object is photographed, the object may not be displayed as being white. Different gain values are given to respective R, G, and B pixels to adjust signal levels. In general, a gain value of G is fixed to 1 and signal levels of R and B are adjusted according to the gain value of G.

A gamma correction circuit 49 performs gamma correction on image data. Tone conversion is performed according to output of the display 190 through the gamma correction.

A color interpolation circuit 50 generates a general color image signal with 3 colors per one pixel from a Bayer signal with one color per one pixel.

A color conversion/color correction circuit 52 performs color space conversion and color correction according to output. As necessary, the color conversion/color correction circuit 52 may use a look up table (LUT). After color conversion/color correction, image data is converted into YCbCr data.

A resolution conversion circuit 53 converts image resolution to adjust a size of the image.

A space filter circuit 54 processes a space filter for image data. The space filter circuit 54 emphasizes an edge of a signal Y and processes a low pass filter (LPF) of signals Cb/Cr.

A CbCr skip readout circuit 55 performs skip readout on the signals Cb/Cr to convert the signals Cb/Cr into image data of YCbCr4:2:2. The image data is output through an output buffer 57 and is recorded in the SDRAM module 160 through a first bus.

In all readout modes, readout may be performed in an interlace manner. In this case, adjacent pixel lines are not present and thus color interpolation may not be directly processed. Thus, after preprocessing is completed, a pixel line order is adjusted through the output buffer 46 and then is stored in the SDRAM module 160 in a progressive form. The image data is re-read and is input to the image processing circuit 132 through an input buffer 51.

However, embodiments of the present disclosure are not limited to the interlace manner in all readout modes. That is, readout may be performed in a progressive manner.

With regard to a still image, a preview image or thumbnail image may be generated such that a small image is displayed after photography. Like in a skip readout mode, data of some pixels is omitted when written.

With regard to a still image, when a continuous photography function is performed at a short time interval, rapid detection of a phase difference is required and thus the features of the aforementioned description may be applied.

An AF signal interpolation circuit 56 interpolates a portion of a phase difference pixel using a general pixel value. As described above, since a phase difference pixel is positioned between general pixels, when the portion is maintained and used, resolution may be degraded. Thus, interpolation is performed using an adjacent general pixel.

The signal of the phase difference pixel separated by the separation circuit 131 is recorded in the SDRAM module 160 through a first bus. Since readout and separation are performed on all of a plurality of pixels, the phase difference pixel signals accumulate in the SDRAM module 160 for a short period of time.

The stored phase difference pixel signal is input to the phase difference calculation circuit 133 through the first bus. The phase difference calculation circuit 133 calculates a phase difference between phase difference pixels and calculates a movement direction and degree of a focus lens. The calculated movement degree is temporarily recorded in a register in the phase difference calculation circuit 133 and is read by a CPU 135.

The CPU 135 reads the calculated movement degree of the focus lens to generate a control command. The generated control command is transmitted to the motor driver 115 to drive the focus lens of the lens 110.

The JPEG codec device 134 compresses YCbCr data to provide a compressed image (e.g., a JPG image). In addition, the compressed image is recorded in the SDRAM module 160. When the CPU 135 reads the compressed image data recorded in the SDRAM module 160 and records the image data in the memory card 170, an image generating procedure is completed.

The electronic device 100 according to the various aforementioned embodiments is not limited to auto focusing technology using a phase difference pixel. That is, the electronic device 100 according to various embodiments may further include a technological component for performing contrast auto focusing. In addition, the electronic device 100 may be embodied using hybrid auto focusing technology using both phase difference auto focusing and contrast auto focusing.

Hereinafter, an auto focusing method will be described with regard to various embodiments.

Figure 13:
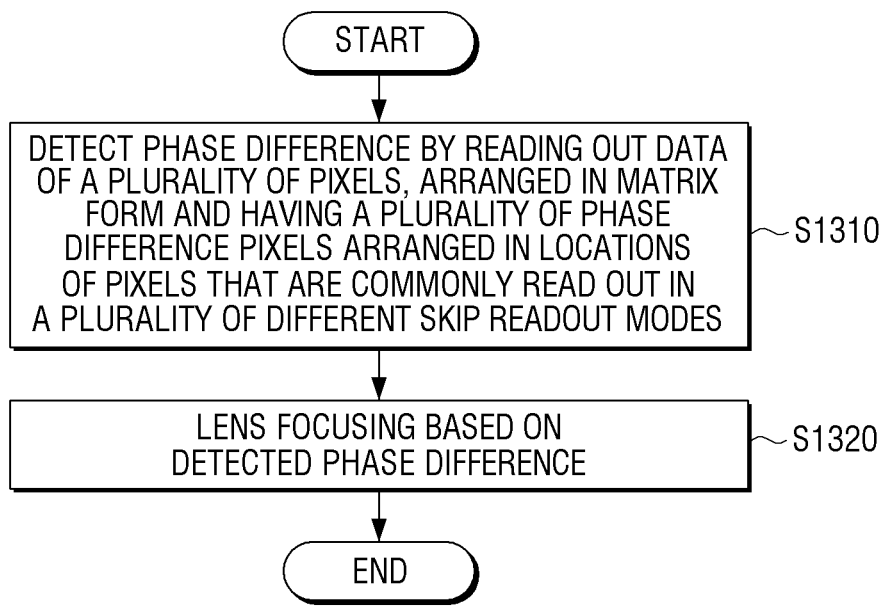
FIGS. 13 and 14 are flowcharts of auto focusing methods according to various embodiments.
Figure 14:
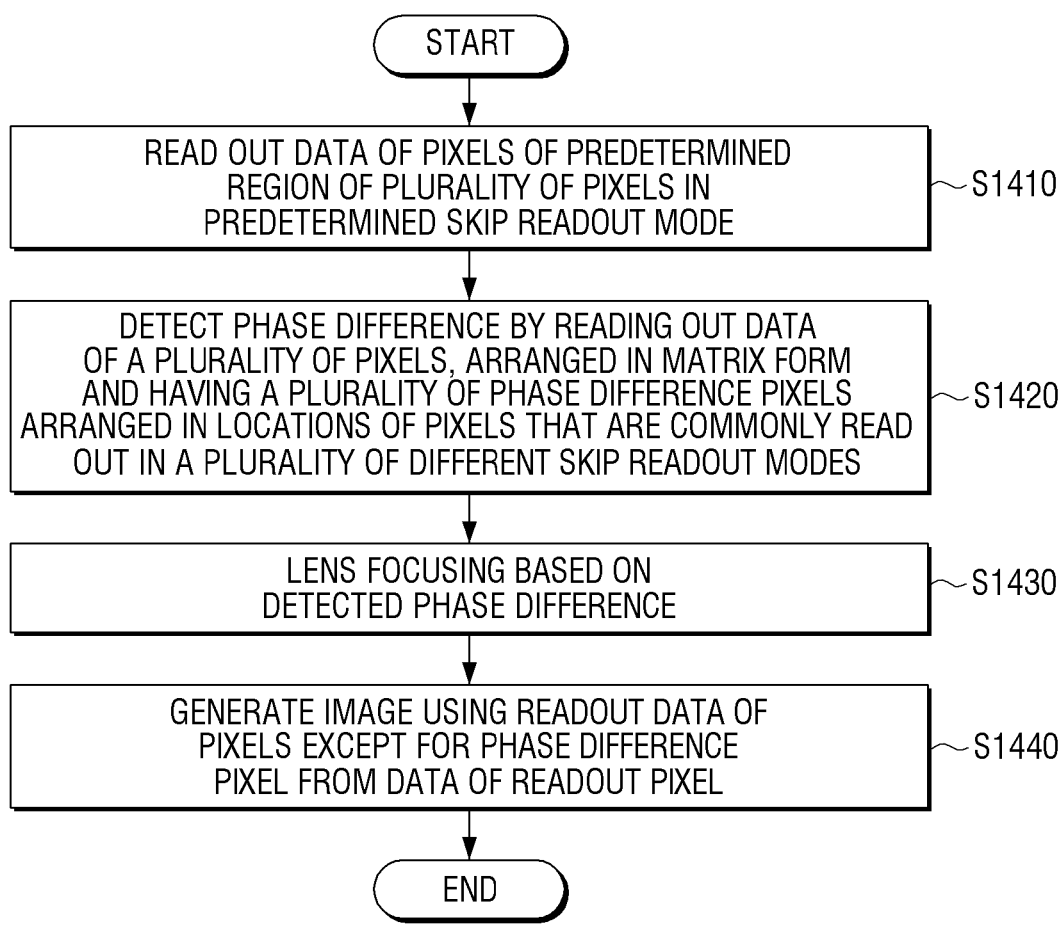

FIGS. 13 and 14 are flowcharts of an auto focusing method according to various embodiments.

Referring to FIG. 13, an auto focusing method of an electronic device according to an embodiment includes operation (S1310) of detecting a phase difference by reading out data of a plurality of pixels arranged in a matrix form and data of a plurality of phase difference pixels arranged in locations of pixels that are commonly read out in a plurality of different skip readout modes from the plurality of pixels, and operation (S1320) of lens focusing based on the detected phase difference.

Referring to FIG. 14, an auto focusing method according to another embodiment includes operations S1420 and S1430 that are analogous to the aforementioned operations S1310 and S1320, respectively. In addition, the auto focusing method may further include operation (S1410) of reading out data of a pixel of a predetermined region of the plurality of pixels in a predetermined skip readout mode and operation (S1440) of generating an image using readout data of pixels except for the phase difference pixel from data of the readout pixel.

In this case, the generated image may be any one of a live view image, a still image, or a moving picture image.

In addition, the plurality of skip readout modes includes a first skip readout mode and a second skip readout mode. In the operation of reading out the data of the pixel of the predetermined region, one pixel line may be read out and two pixel lines may be skipped in the first skip readout mode, and two pixel lines may be read out and two pixel lines may be skipped in the second skip readout mode.

The pixel line may be any one of a horizontal pixel line and a vertical pixel line of a plurality of pixels that are arranged in a matrix form.

A first pixel region of the plurality of pixels may be read out in the first skip readout mode, a second pixel region of the plurality of pixels may be read out in the second skip readout mode, and the plurality of phase difference pixels may be arranged at portions in which the first and second pixel regions at least partially overlap each other.

In the operation of generating an image, a first resolution image may be generated in the first skip readout mode and a second resolution image may be generated in the second skip readout mode.

The plurality of pixels may have a matrix pattern in which one first phase difference pixel, two first general pixels, one second phase difference pixel, and 8 second general pixels are sequentially arranged in a vertical or horizontal direction.

In addition, the first phase difference pixel and the second phase difference pixel may be different types of phase difference pixels constituting one pair.

Like in the aforementioned embodiments, when phase difference pixels are arranged, data of the phase difference pixels may be uniformly read out in all readout modes and skip readout modes, and thus, a phase difference may be detected in all modes. Thus, auto focusing is possible without blurring of an image in all modes.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

In addition, the aforementioned auto focusing method may be provided by any one of a complex instruction set computer (CISC) chip, a reduced instruction set computer (RISC) chip, and a bit slice micro processing unit (MPU) in the form of embedded software or firmware.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A solid-state image sensor of an electronic device, comprising:
    a plurality of pixels arranged in a matrix form; and
    a plurality of phase difference pixels, of the plurality of pixels, arranged in the matrix form based on a plurality of different skip readout modes at locations of pixels that are commonly read out in each of the plurality of different skip readout modes;
    wherein the plurality of skip readout modes comprises a first skip readout mode in which one pixel line is read out and two pixel lines are skipped and a second skip readout mode in which two pixel lines are read out and two pixel lines are skipped.

2. The solid-state image sensor as claimed in claim 1, wherein:
    the plurality of pixels are classified into a first pixel region that is read out in the first skip readout mode and a second pixel region that is read out in the second skip readout mode and are processed; and
    the plurality of phase difference pixels are arranged such that portions of the first and second pixel regions overlap each other.

3. The solid-state image sensor as claimed in claim 1, wherein each of the plurality of phase difference pixels is spaced apart from another adjacent phase difference pixel at an interval corresponding to at least two pixels.

4. The solid-state image sensor as claimed in claim 1, wherein the plurality of pixels have a matrix pattern in which a sequence of adjacent pixels includes one first phase difference pixel, two first general pixels, one second phase difference pixel, and 8 second general pixels that are sequentially arranged in a vertical or horizontal direction.

5. The solid-state image sensor as claimed in claim 4, wherein the first phase difference pixel and the second phase difference pixel are different types of phase difference pixels of one pair of phase difference pixels.

6. An electronic device comprising:
    a solid-state image sensor comprising a plurality of pixels arranged in a matrix form, the plurality of pixels having a plurality of phase difference pixels arranged in the matrix form based on a plurality of different skip readout modes at locations of pixels that are commonly read out in each of the plurality of different skip readout modes; and a controller for reading out data of the phase difference pixel to detect a phase difference and performing lens focusing based on the detected phase difference;

wherein the plurality of skip readout modes comprises a first skip readout mode in which one pixel line is read out and two pixel lines are skipped and a second skip readout mode in which two pixel lines are read out and two pixel lines are skipped.

7. The electronic device as claimed in claim 6, wherein the pixel line is any one of a horizontal pixel line or a vertical pixel line of a plurality of pixels that are arranged in a matrix form.

8. The electronic device as claimed in claim 6, wherein:
the controller reads out a first pixel region of the plurality of pixels in the first skip readout mode and reads out a second pixel region of the plurality of pixels in the second skip readout mode; and
the plurality of phase difference pixels are arranged such that portions of the first and second pixel regions overlap each other.

9. The electronic device as claimed in claim 6, wherein the controller generates a first resolution image in the first skip readout mode and generates a second resolution image in the second skip readout mode.

10. The electronic device as claimed in claim 6, wherein the controller reads out data of pixels except for the phase difference pixel from the plurality of pixels to generate an image.

11. The electronic device as claimed in claim 10, wherein the image is any one of a live view image, a still image, or a moving picture image.

12. The electronic device as claimed in claim 6, wherein the plurality of pixels have a matrix pattern in which a sequence of adjacent pixels includes one first phase difference pixel, two first general pixels, one second phase difference pixel, and 8 second general pixels that are sequentially arranged in a vertical or horizontal direction.

13. The electronic device as claimed in claim 12, wherein the first phase difference pixel and the second phase difference pixel are different types of phase difference pixels of one pair of phase difference pixels.

14. The electronic device as claimed in claim 12, wherein each of the plurality of phase difference pixels is spaced apart from another adjacent phase difference pixel at an interval corresponding to at least two pixels.

15. An auto focusing method of an electronic device, comprising:
detecting a phase difference by reading out data of a plurality of pixels arranged in a matrix form, including data of a plurality of phase difference pixels of the plurality of pixels, the plurality of phase difference pixels arranged in the matrix form based on a plurality of different skip readout modes at locations of pixels that are commonly read out in each of the plurality of different skip readout modes; and
performing lens focusing based on the detected phase difference;

wherein:
the plurality of skip readout modes comprises a first skip readout mode and a second skip readout mode; and
the reading out of the data of the predetermined region comprises reading out one pixel line and skipping two pixel lines in the first skip readout mode, and reading out two pixels lines and skipping two pixel lines in the second skip readout mode.

16. The auto focusing method as claimed in claim 15, further comprising:
reading out data of a pixel of a predetermined region from the plurality of pixels in a predetermined skip readout mode; and
generating an image using readout data of pixels except for the phase difference pixel from the data of the readout pixel.

17. The auto focusing method as claimed in claim 15, wherein the pixel line is any one of a horizontal pixel line or a vertical pixel line of a plurality of pixels that are arranged in a matrix form.

18. The auto focusing method as claimed in claim 15, wherein:
a first pixel region of the plurality of pixels is read out in the first skip readout mode and a second pixel region of the plurality of pixels is read out in the second skip readout mode; and
the plurality of phase difference pixels are arranged such that portions of the first and second pixel regions overlap each other.

19. The auto focusing method as claimed in claim 16, wherein the image is any one of a live view image, a still image, or a moving picture image.

20. The auto focusing method as claimed in claim 16, wherein the generating of the image comprises generating a first resolution image in the first skip readout mode and generating a second resolution image in the second skip readout mode.

21. The auto focusing method as claimed in claim 15, wherein the plurality of pixels have a matrix pattern in which a sequence of adjacent pixels includes one first phase difference pixel, two first general pixels, one second phase difference pixel, and 8 second general pixels that are sequentially arranged in a vertical or horizontal direction.

22. The auto focusing method as claimed in claim 21, wherein the first phase difference pixel and the second phase difference pixel are different types of phase difference pixels of one pair of phase difference pixels.

* * * * *